M. F. CAGLE.
BED PAN.
APPLICATION FILED DEC. 18, 1908.

932,442.

Patented Aug. 31, 1909.

Witnesses
William C. Linton.
C. C. Hines.

Inventor
Mollie F. Cagle.
By Victor J. Evans
Attorney

UNITED STATES PATENT OFFICE.

MOLLIE F. CAGLE, OF KNOXVILLE, TENNESSEE.

BED-PAN.

932,442.

Specification of Letters Patent.

Patented Aug. 31, 1909.

Application filed December 18, 1908. Serial No. 468,199.

*To all whom it may concern:*

Be it known that I, MOLLIE F. CAGLE, a citizen of the United States, residing at Knoxville, in the county of Knox and State of Tennessee, have invented new and useful Improvements in Bed-Pans, of which the following is a specification.

This invention relates to improvements in bed pans, and more particularly to an attachment for bed pans designed especially to be used when the pan is employed by female patients in the act of micturition, whereby all of the urine will be deflected and conducted into the pan and any portion of it prevented from escaping and running down the sides of the pan and wetting the bed.

The object of the invention is to provide a baffle, shield or deflector for the purpose set forth, which may be readily applied for use and removed after use, so that other uses of the pan will not be interfered with, and which may be easily cleansed and conveniently suspended for ready removal from a suitable support when its use is required.

The invention consists of the features of construction, combination and arrangement of parts hereinafter fully described and claimed, reference being had to the accompanying drawing, in which:—

Figure 1:
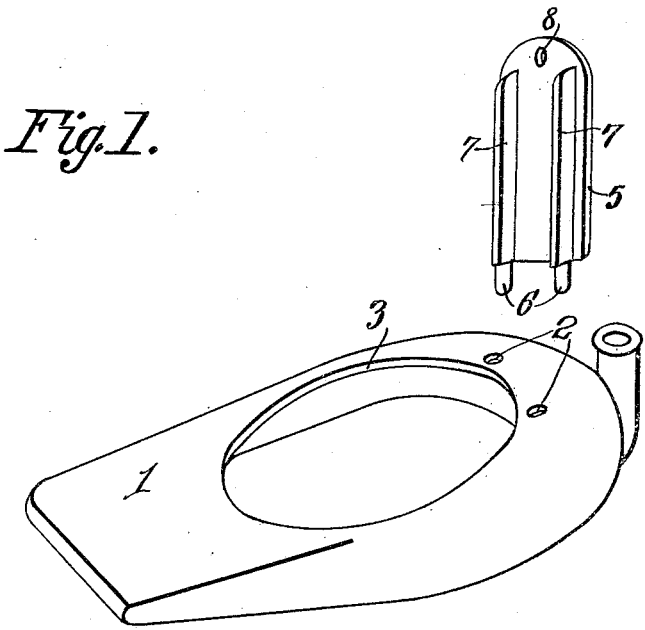
Figure 2:
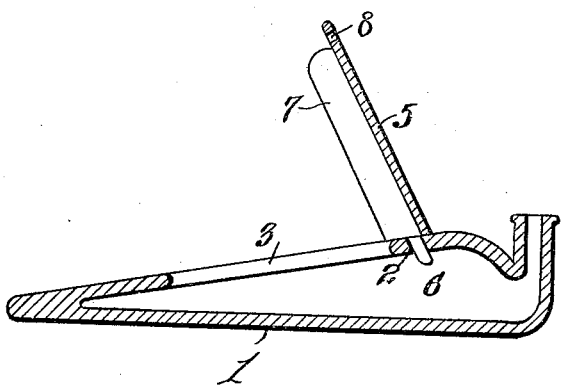

Figure 1 is a perspective view of a bed pan and my attachment therefor, the latter being represented as disconnected from the pan. Fig. 2 is a vertical longitudinal section of the pan with the attachment applied for use.

Referring to the drawing, 1 designates a bed-pan of ordinary form and construction, except that, in accordance with my invention, the elevated front portion of the top of the pan is provided with a pair of spaced openings 2 adjacent to the front edge of the wall of its inlet aperture 3.

The attachment comprises an oblong rectangular baffle, shield or deflector plate 5, preferably, although not necessarily, composed of the same material as the pan—namely, chinaware, enameled sheet-metal ware (granite ware), or any of the readily-cleansible materials of which pans of this character are customarily made. This plate is adapted to rest at its lower edge upon the front portion of the top wall of the pan and to incline in an upward and rearward direction over the forward portion of the aperture 3. For the purpose of detachably securing the plate in such position, spaced pins or projections 6 extend from the lower edge of the plate and are adapted to enter the openings 2.

In the use of the pan by a female patient in the operation of micturition, the urine is frequently discharged with sufficient force to project a portion of the urine beyond the front of the aperture 3, which portion consequently flows down the sides of the pan and wets the bed. This objection is prevented by the use of the plate, which not only acts as a barrier to the passage of any portion of the water beyond the opening, but, by reason of its inclined position, guides and conducts all of the water which strikes thereagainst down into the pan. This function is promoted by the use of longitudinal guard flanges 7 upon the face of the plate, which flanges are spaced apart nearly the full width of the plate to prevent the water from being laterally deflected and to form a channel for the downflow of the water. At its upper end the plate is formed with an opening 8, by which it may be suspended, when not in use, from a hook, nail or other suitable support.

It will be seen from the foregoing description that the attachment may be instantly applied for use at any time for the purpose described, and as quickly removed so that it will not interfere with other uses of the pan. It will also be apparent that it may be thoroughly cleaned after use, and that its construction is simple, so that it may be inexpensively manufactured.

Other ways of supporting the plate in position may be employed, but that shown is preferred, as the only change in the construction of any pan to adapt the device for application thereto is to provide the receiving openings 2, as will be readily understood.

Having thus fully described the invention, what is claimed as new is:—

1. The combination with a bed pan having a chamber therein, and a top wall overhanging said chamber and provided with an entrance opening, said wall also being formed at its outer end with a pair of spaced apertures adjacent the opening, of a deflector comprising an oblong rectangular plate provided at its lower edge with a pair of spaced pins to fit within said apertures and formed upon its acting face with spaced longitudinal guard flanges.

2. The combination with a bed-pan having a receiving chamber and provided with a top wall overhanging said chamber and formed with an entrance opening, and provided in its front portion with a pair of spaced apertures adjacent said opening, said apertures being downwardly and forwardly inclined, of a deflector comprising an oblong rectangular plate provided at its lower end with a pair of spaced depending pins to removably engage said apertures and formed upon its acting face with a pair of spaced longitudinal flanges, the lower end of the blade and the lower edges of the flanges being inclined to rest upon the top wall and support the deflector in a correspondingly inclined position above the front of said entrance opening.

In testimony whereof I affix my signature in presence of two witnesses.

MOLLIE F. CAGLE.

Witnesses:
W. BORIGHT,
P. B. HOLDEN.